United States Patent
O'Brien et al.

(10) Patent No.: US 11,257,471 B2
(45) Date of Patent: Feb. 22, 2022

(54) LEARNING PROGRESSION FOR INTELLIGENCE BASED MUSIC GENERATION AND CREATION

(71) Applicant: Samsung Electronics Company, Ltd., Gyeonggi-Do (KR)

(72) Inventors: Sean O'Brien, Vancouver (CA); Erick Wong, Vancouver (CA); Julia Wong, Burnaby (CA)

(73) Assignee: SAMSUNG ELECTRONICS COMPANY, LTD., Suwon (KR)

(*) Notice: Subject to any disclaimer, the term of this patent is extended or adjusted under 35 U.S.C. 154(b) by 49 days.

(21) Appl. No.: 16/872,277

(22) Filed: May 11, 2020

(65) Prior Publication Data
US 2021/0350776 A1 Nov. 11, 2021

(51) Int. Cl.
*G10H 1/00* (2006.01)
*B25J 11/00* (2006.01)
*G06N 3/08* (2006.01)

(52) U.S. Cl.
CPC ........ *G10H 1/0025* (2013.01); *B25J 11/0035* (2013.01); *G06N 3/08* (2013.01); *G10H 2210/031* (2013.01)

(58) Field of Classification Search
CPC ............. G10H 1/0025; G10H 2210/031; B25J 11/0035; G06N 3/08
USPC .......................................................... 84/609
See application file for complete search history.

(56) References Cited

U.S. PATENT DOCUMENTS

| | | | | |
|---|---|---|---|---|
| 5,648,627 A | * | 7/1997 | Usa | G10H 1/0556 84/600 |
| 5,808,219 A | * | 9/1998 | Usa | G10H 1/00 84/477 B |
| 6,782,308 B2 | * | 8/2004 | Yamaura | A63H 3/28 369/47.11 |
| 7,189,915 B2 | * | 3/2007 | Kobayashi | G10H 1/0066 704/268 |

(Continued)

OTHER PUBLICATIONS

Samsung Ballie at CES 2020 https://news.samsung.com/us/samsung-ballie-ces-2020/, Jan. 7, 2020.

(Continued)

*Primary Examiner* — Jeffrey Donels
(74) *Attorney, Agent, or Firm* — Baker Botts L.L.P.

(57) ABSTRACT

An artificial intelligence (AI) method includes generating a first musical interaction behavioral model. The first musical interaction behavioral model causes an interactive electronic device to perform a first set of musical operations and a first set of motional operations. The AI method further includes receiving user inputs received in response to the performance of the first set of musical operations and the first set of motional operations and determining a user learning progression level based on the user inputs. In response to determining that the user learning progression level is above a threshold, the AI method includes generating a second musical interaction behavioral model. The second musical interaction behavioral model causes the interactive electronic device to perform a second set of musical operations and a second set of motional operations. The AI method further includes performing the second set of musical operations and the second set of motional operations.

18 Claims, 4 Drawing Sheets

(56) References Cited

U.S. PATENT DOCUMENTS

| | | | |
|---|---|---|---|
| 9,792,889 B1* | 10/2017 | Obara | G10H 1/0025 |
| 10,643,593 B1* | 5/2020 | Kolen | G10H 1/0025 |
| 2002/0068995 A1 | 6/2002 | Yoshida | |
| 2003/0088336 A1 | 5/2003 | Osawa | |
| 2004/0231499 A1* | 11/2004 | Kobayashi | G10H 5/005 84/645 |
| 2004/0243413 A1* | 12/2004 | Kobayashi | G10L 13/033 704/258 |
| 2011/0144804 A1 | 6/2011 | Song | |
| 2017/0133009 A1 | 5/2017 | Cho | |
| 2019/0094980 A1 | 3/2019 | Reddy | |
| 2019/0156806 A1* | 5/2019 | Maezawa | G10H 1/00 |
| 2020/0074225 A1* | 3/2020 | Doke | G06K 9/00342 |
| 2020/0202825 A1* | 6/2020 | Kolen | G06K 9/00355 |
| 2020/0324073 A1* | 10/2020 | Rajan Kesavelu Shekar | G06N 3/08 |
| 2020/0342646 A1* | 10/2020 | Wang | G06T 13/205 |
| 2020/0380940 A1* | 12/2020 | Abdallah | G06N 7/005 |
| 2021/0027199 A1* | 1/2021 | Avery | H04R 3/04 |

OTHER PUBLICATIONS

International Search Report for PCT/KR2021/005619 dated Aug. 6, 2021, 3 pages, Aug. 6, 2021.

* cited by examiner

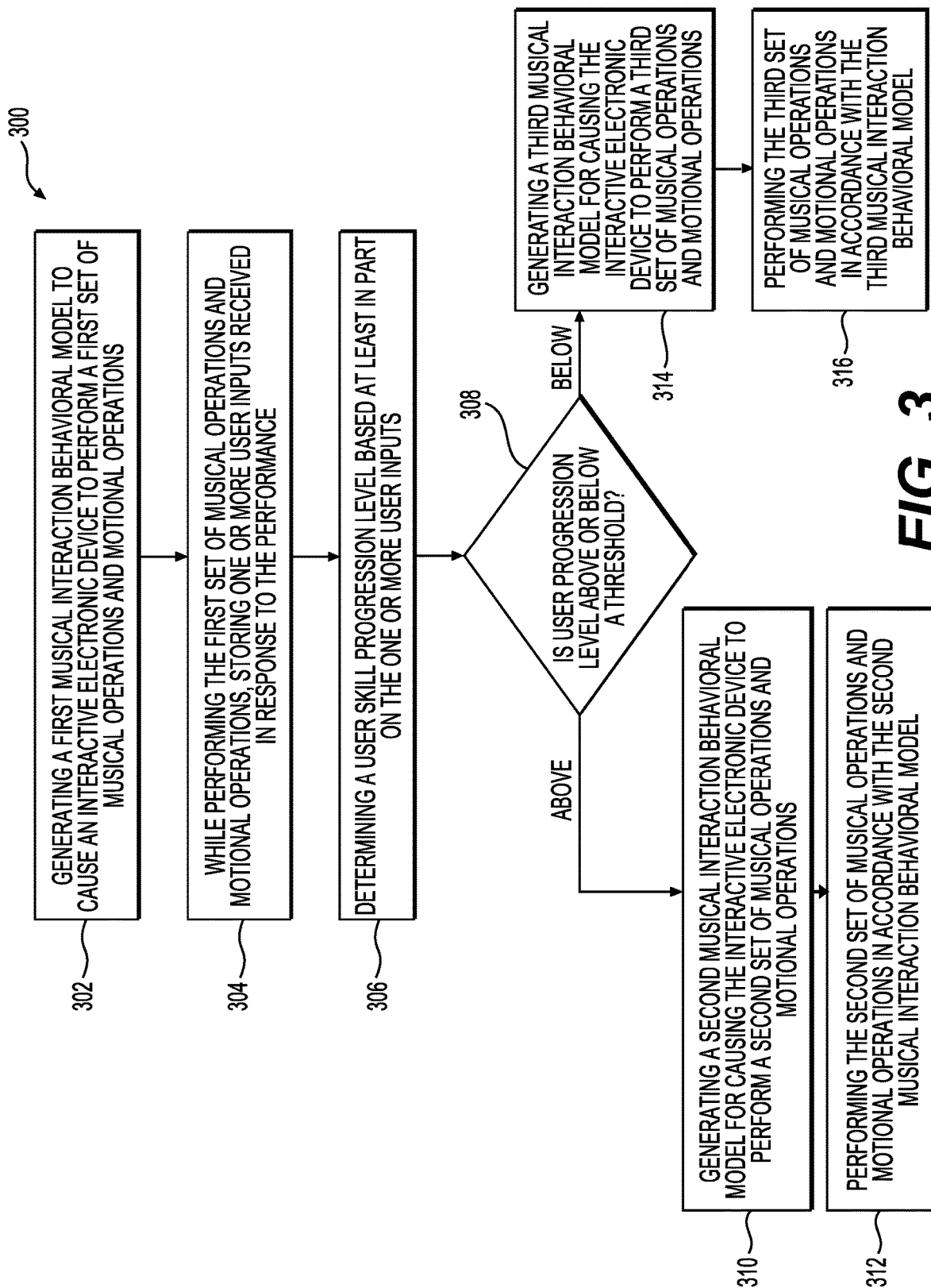

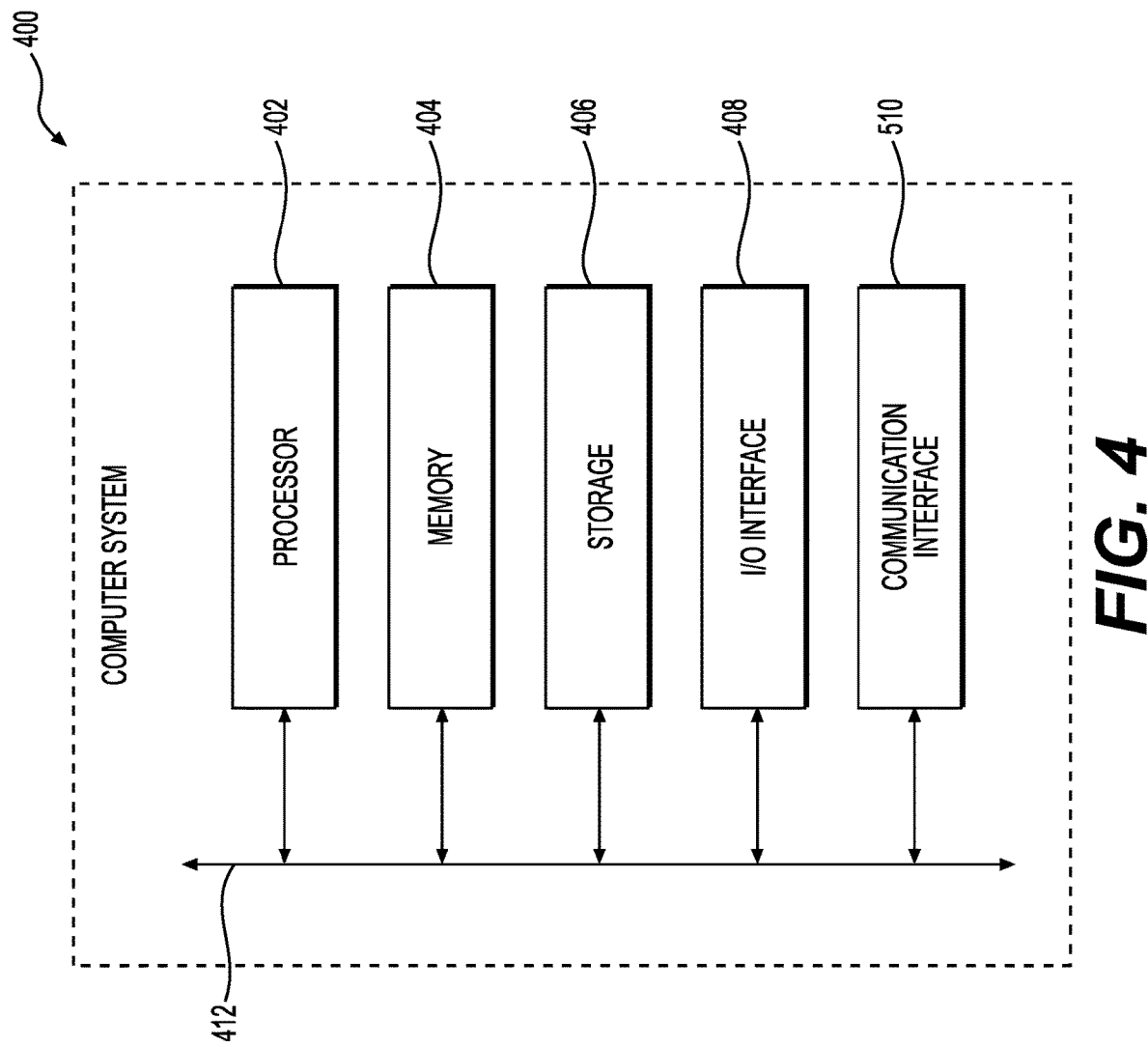

LEARNING PROGRESSION FOR INTELLIGENCE BASED MUSIC GENERATION AND CREATION

TECHNICAL FIELD

This disclosure relates generally to intelligence based music generation and creation, and, more specifically, to a learning progression for intelligence based music generation and creation.

BACKGROUND

Social robots generally include artificial intelligence (AI) devices that are provided to interact with various users and various types of devices. In certain instances, the social robot may be suited to perform one or more specific tasks or duties. For instance, many social robots have been deployed in various workplace environments to perform job functions, such as customer service, custodial services, stocking and inventory services, or other similar tasks. In other instances, social robots have also been deployed to perform one or more home-oriented tasks, such as raking leaves, mowing the lawn, watering plants, sorting clothing, or other similar home chores that may be repeated rather periodically. However, while social robots have become vastly efficient in performing and supporting utilitarian functions and tasks, social robots have not been readily adept at performing and supporting aesthetic and/or creative functions and tasks. Thus, it may be useful to provide improved creativity supporting functions for social robots.

BRIEF DESCRIPTION OF THE DRAWINGS

FIG. 3 illustrates a flow diagram of a method for providing interactive music conducting and composing activity through intelligence based learning progression.

FIG. 4 illustrates an example computer system.

DESCRIPTION OF EXAMPLE EMBODIMENTS

Figure 1:
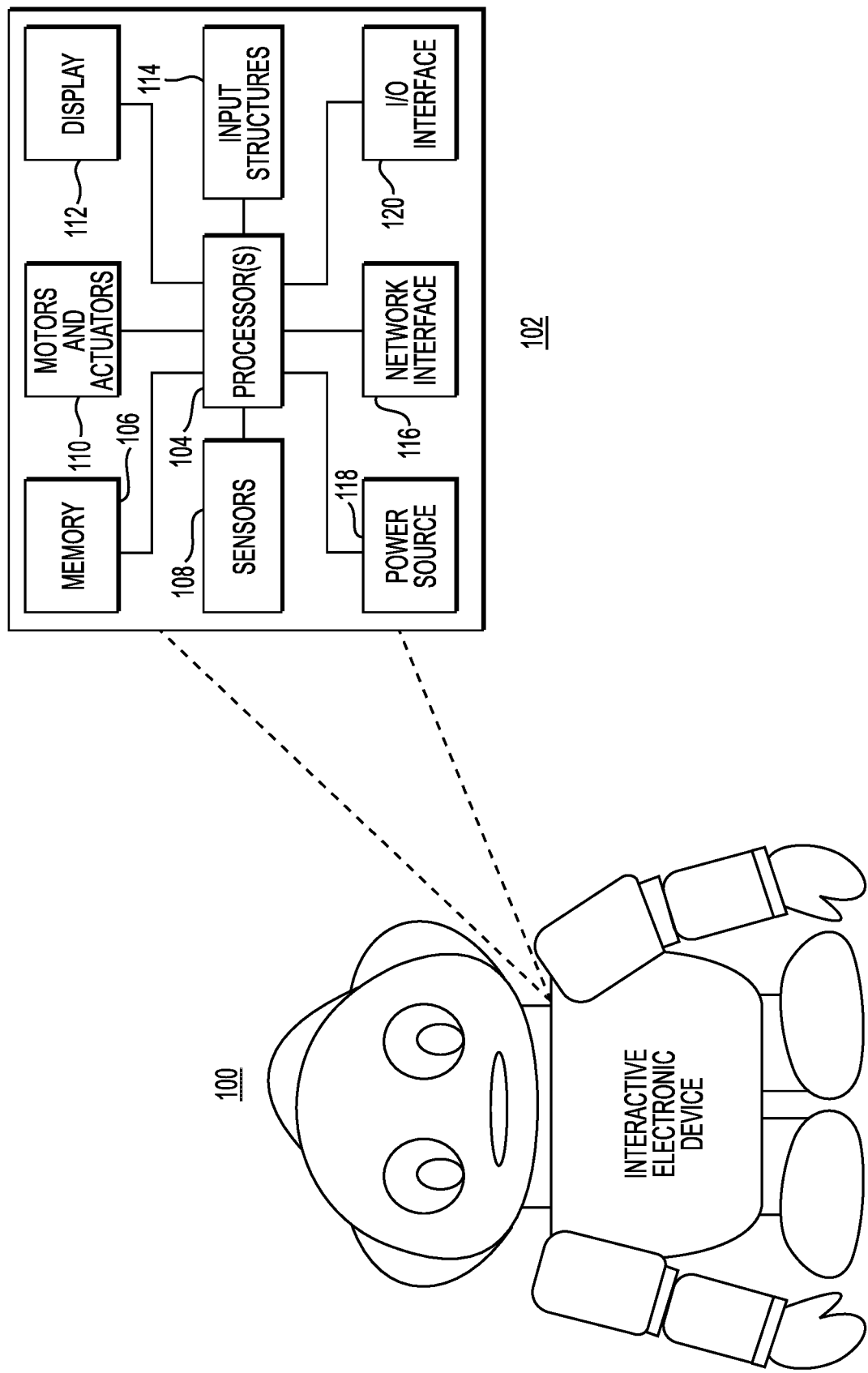
FIG. 1 illustrates an example interactive electronic device.

The present embodiments include an interactive electronic device for providing interactive music conducting and composing activity through intelligence based learning progression. In some embodiments, the interactive electronic device may generate a first musical interaction behavioral model utilized to cause the interactive electronic device to perform a first set of musical operations and a first set of motional operations. For example, in certain embodiments, the interactive electronic device may be initially suited according to a baseline preconfigured behavior (e.g., initial elementary user learning progression level), which may include, for example, a predetermined baseline set of musical operations (e.g., a baseline set of simpler songs, singular instrument sounds, single-instrument instrumentals, simple speech phrases, child-friendly sing-along vocals, melodies, and/or other simple musical operations for conducting or composing) and a predetermined baseline set of motional operations (e.g., a baseline set of head and neck motions, limb and joint motions, body motions, and so forth).

In certain embodiments, while the interactive electronic device performs the first set of musical operations and the first set of motional operations, the interactive electronic device may concurrently receive one or more user inputs in response to the performance of the first set of musical operations and the first set of motional operations. For example, in some embodiments, while performing the predetermined baseline set of musical operations and motional operations, the interactive electronic device may receive and store in real-time or near real-time various user inputs, such as visual user inputs (e.g., user gestures, user body language, user physical motions, and so forth), user audible inputs (e.g., user voice sounds, user speech commands and replies, user instrumental music, user song notes, and so forth), user engagement level inputs (e.g., user eye gaze indicating an attentional level of the user; user facial expression indicating an emotional response of the user such as happy, sad, or indifferent; user physical activity; and so forth).

In certain embodiments, the interactive electronic device may then determine a user learning progression level based on the one or more user inputs, and, further, whether the user learning progression level is above or below a threshold. For example, in some embodiments, the interactive electronic device may determine whether the user learning progression level is above or below the threshold by qualifying the current user inputs (e.g., vocal inputs, instrument inputs, gesture inputs, and so forth) performed in response to a particular learning progression curriculum with respect to the baseline learning progression level of the curriculum. In one embodiment, the interactive electronic device may compare the current user inputs (e.g., vocal inputs, instrument inputs, gesture inputs, and so forth) to a generated user-specific learning benchmark (e.g., based on historical data for a particular early-stage user) to determine a proficiency level of particular early-stage user with respect to the baseline learning progression level. In other embodiments, the interactive electronic device may access, for example, a cloud-based service and compare the current user inputs (e.g., vocal inputs, instrument inputs, gesture inputs, and so forth) to those of other early-stage users determined to be at the baseline learning progression level.

Further, in another embodiment, the interactive electronic device may determine whether the user learning progression level is above or below the threshold based on a determined user engagement level (e.g., user eye gaze indicating an attentional level of the user; user facial expression indicating an emotional response of the user such as happy, sad, or indifferent; user physical activity; and so forth). For example, if the user is determined to be happy (e.g., smiling facial expression) and/or attentive (e.g., eyes gazing at the interactive electronic device for a certain period of time), the interactive electronic device may determine that the user is engaged and currently at the appropriate learning progression level or provide a recommendation of when the user should consider advancing to a next learning progression level within a curriculum. On the other hand, if the user is determined to be sad (e.g., crying or frowning facial expression) and/or indifferent (e.g., sullen facial expression or eyes looking away from the interactive electronic device for a certain period of time), the interactive electronic device may determine that the user is disengaged and should be advanced to a next learning progression level within a curriculum or advanced enough to understand to stop the current activity.

In response to determining that the user learning progression level is above the threshold, the interactive electronic device may then generate a second musical interaction behavioral model to cause the interactive electronic device to perform a second set of musical operations and a second set of motional operations. For example, in some embodiments, as an early-stage user (e.g., a child, a toddler, a preadolescent), for example, increases interaction and engagement with the interactive electronic device, the interactive electronic device may generate a user-specific preference and behavioral model to be iteratively trained and retrained over time based on the series of interactions or engagements between the particular early-stage user and the interactive electronic device. In some embodiments, the user-specific preference and behavioral model generated by the interactive electronic device may include a predetermined number of learning progression levels and/or a predetermined number of sets of learning progression levels. For example, in one embodiment, the interactive electronic device may provide a learning progression curriculum that prompts an early-stage user, for example, to identify and match (e.g., with increasing complexity levels) sounds of particular instruments currently being outputted by the interactive electronic device. Similarly, in another embodiment, the interactive electronic device may provide a learning progression curriculum that prompts an early-stage user, for example, to identify and repeat one or more vocal exercises (e.g., with increasing complexity levels) that are led by the interactive electronic device.

In some embodiments, the user-specific preference and behavioral model (e.g., corresponding to advancing user learning progression levels of the curriculum) may include, for example, a predetermined advanced set of musical operations (e.g., an advanced set of songs, instruments, sounds, speech phrases, phonetic sounds, sing-along vocals, melodies, humming, chord sequences, contextual interactions, and/or other musical operations for conducting or composing) and a predetermined advanced set of motional operations (e.g., an advanced set of head and neck motions, limb and joint motions, body motions, dance motions, eye motions, and so forth). The interactive electronic device may then perform the second set of musical operations and the second set of motional operations in accordance with the second musical interaction behavioral model.

On the other hand, in response to determining that the user learning progression level is below the threshold, the interactive electronic device may then generate a third musical interaction behavioral model to cause the interactive electronic device to perform a third set of musical operations and a third set of motional operations. For example, in some embodiments, the interactive electronic device may determine that the baseline preconfigured behavioral model is itself beyond the learning progression level of a particular early-stage user (e.g., a toddler) as the interactive electronic device learns and adapts to the early-stage user based on for example, the increasing interaction and engagement with the early-stage user. The interactive electronic device may then generate a lower learning progression level user-specific preference and behavioral model, which may correspond to, for example, a set of musical operations (e.g., simpler than that of the preconfigured baseline musical operations, such as a set of only lullaby tunes without accompanying vocals, which the early-stage user may find soothing) and set of motional operations (e.g., simpler than that of the preconfigured baseline motional operations, such as only vertical and horizontal head motions while the body of the interactive electronic device remains fixed so as to not alarm the early-stage user).

In another embodiment, the interactive electronic device may be utilized by more than one user, either concurrently or individually. For example, in some embodiments, the interactive electronic device may be utilized, for example, by siblings or other associated users of different ages and/or learning progression levels. In such an embodiment, the interactive electronic device may generate and iteratively train and retrain user-specific preference and behavioral models for each of the individual users, and may thus be programmed to identify and distinguish the individual users before user interaction and engagement. For example, in one embodiment, the interactive electronic device may be configured to identify and distinguish the associated users based on, for example, facial recognition, voice recognition, gesture recognition, and/or other contextual engagement between the associated users and the interactive electronic device. Once the interactive electronic device identifies the current user, the interactive electronic device may then select and operate according to the user-specific preference and behavioral model corresponding to the identified user.

Thus, the present embodiments may provide an interactive electronic device to instruct, interact, and engage with early-stage users in the creation and generation of music conducting and composition through intelligence based progression learning (e.g., creativity and learning levels progress as the early-stage user advances in age, advances in expertise, and/or as the early-stage user interest wanes). In this way, the interactive electronic device may provide a sense of peer-to-peer companionship (e.g., a sense of social and emotional bonding between an early-stage user and the interactive electronic device or a sense of "growing-up together" between the early-stage user and the interactive electronic device) for early-stage users over the course of, for example, the entire toddlerdom and childhood of the early-stage user.

While the present embodiments may be discussed below primarily with respect to biped interactive electronic devices, it should be appreciated that the present techniques may be applied to any of various interactive electronic devices that may facilitate users in interactive music conducting and composition through intelligence based progression learning. As used herein, an "interactive electronic device" may refer to any electronic device or computing device that may be configured with computer-based intelligence (e.g., machine learning [ML], artificial intelligence [AI], deep learning, cognitive computing, artificial neural networks [ANN], and so forth), which may be utilized by the interactive electronic device to interact and engage with one or more users through, for example, speech, song, music, motions, actions, gestures, body movements, facial expressions, limb and joint motions, display changes, lighting, sounds, and so forth. For example, in one embodiment, an "interactive electronic device" may include a social robot or similar AI or cognitive computing device that may be provided to contextually interact, instruct, and engage with (e.g., in real-time or near real-time), for example, humans, pets, other robotic electronic devices, one or more servers, one or more cloud-based services, home appliances, electronic devices, automobiles, and so forth. Furthermore, as used herein, an "interactive electronic device" may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

With the forgoing in mind, it may be useful to describe an example interactive electronic device 100, as illustrated by FIG. 1. As depicted by FIG. 1, in one embodiment, the interactive electronic device 100 may include an autonomous or semi-autonomous social robot that may be provided to interact, instruct, and engage with one or more early-stage users (e.g., children, toddlers, preadolescents) in learning to conduct and compose musical and/or vocal compositions. It should be appreciated that while the interactive electronic device 100 may be illustrated and discussed herein with respect to a biped social robot, in other embodiments, the interactive electronic device 100 may include, for example, a spherical social robot (e.g., a ball), a pet-like social robot (e.g., a puppy or a kitten), a vehicular social robot (e.g., a rover or a small car), or other similar embodiment of a social and/or companion-style robotic device. As further depicted by FIG. 1, the interactive electronic device 100 may include an onboard computing system 102 that may be utilized for the operation of the interactive electronic device 100, in accordance with the presently disclosed embodiments.

For example, in some embodiments, the onboard computing system 102 may include, among other things, one or more processor(s) 104, memory 106, sensors 108, one or more motors and actuators 110, a display 112, input structures 114, network interfaces 116, a power source 118, and an input/output (I/O) interface 120. It should be noted that FIG. 1 is merely one example of a particular implementation and is intended to illustrate the types of components that may be present in the interactive electronic device 100. As depicted, the one or more processor(s) 104 may be operably coupled with the memory 106 to perform various algorithms for providing interactive music conducting and composing activity through intelligence based learning progression. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the interactive electronic device 100 to provide various functionalities.

In certain embodiments, the sensors 108 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 110 may include any number of electronic motors (e.g., DC motors) that may be utilized to drive actuators, which may allow the interactive electronic device 100 to perform various mechanical operations and/or motional operations (e.g., walking, head and neck motions, limb and joint motions, body motions, dance motions, eye motions, and so forth). The display 112 may include any display architecture (e.g., LCD, OLED, e-Ink, and so forth), which may provide further means by which users may interact and engage with the interactive electronic device 100. In one embodiment, the display 112 may correspond, for example, to the eyes of the interactive electronic device 100.

In certain embodiments, the input structures 114 may include any physical structures utilized to control one or more global functions of the interactive electronic device 100 (e.g., pressing a button to power "ON" or power "OFF" the interactive electronic device 100). The network interface 116 may include, for example, any number of network interfaces suitable for allowing the interactive electronic device 100 to access and receive data over one or more cloud-based networks (e.g., a cloud-based service that may service hundreds or thousands of the interactive electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the interactive electronic device 100 for operation. Similarly, the I/O interface 120 may be provided to allow the interactive electronic device 100 to interface with various other electronic or computing devices, such as one or more auxiliary electronic devices.

Figure 2:
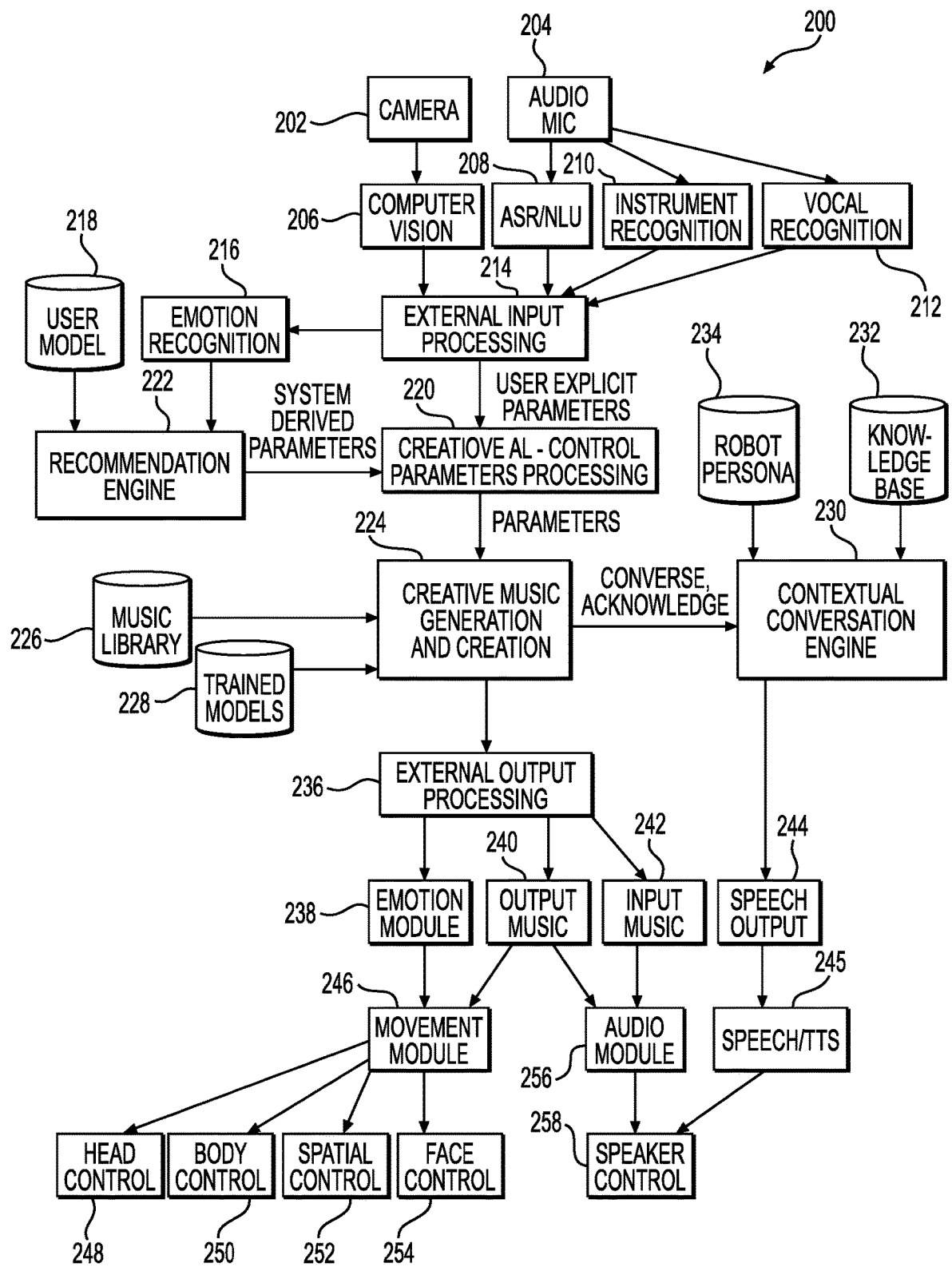
FIG. 2 illustrates example functional blocks of the interactive electronic device for providing interactive music conducting and composing activity through intelligence based learning progression.

FIG. 2 illustrates example functional blocks 200 (e.g., that may operate on the onboard computing system 102 of the interactive electronic device 100) for providing interactive music conducting and composing activity through intelligence based learning progression, in accordance with the presently disclosed embodiments. It should be appreciated that the various functional blocks 200 illustrated by FIG. 2 may include, for example, hardware elements (e.g., circuitry and/or combinational logic such as the one or more processor(s) 104), software elements (e.g., one or more software systems or other computer code that may be stored on a computer-readable medium such as the memory 106), or some combination of both hardware elements and software elements.

As depicted, in certain embodiments, the interactive electronic device 100 may receive visual inputs 202 (e.g., facial recognition user inputs, gesture user inputs, facial expression user inputs) and audio or audible inputs 204 (e.g., user voice sounds, user speech commands and replies, user instrumental music, user song notes, and so forth) to inform the interactive electronic device 100 of the activity of the user. For example, in some embodiments, the visual inputs 202 may be processed, for example, by a computer vision block 206 to determine various user gestures, user body language, user facial expressions, and/or user eye gaze as indication, for example, of a user engagement level (e.g., user eye gaze indicating an attentional level of the user; user facial expression indicating an emotional response of the user such as happy, sad, or indifferent; user physical activity; and so forth). Further, in some embodiments, the visual inputs 202 may also be utilized, for example, to track the real-time or near real-time motion of the user to ensure that the user remains within the field of view (FOV) of the interactive electronic device 100. In one embodiment, should the interactive electronic device 100 detect that a user has moved outside of its FOV, the interactive electronic device 100 may generate a speech request instructing the user to move back into its FOV to continue the interaction or engagement or abandon the activity altogether.

In certain embodiments, the audio or audible inputs 204 may be processed, for example, by an automatic speech recognition (ASR) and natural language understanding (NLU) block 208 to learn and determine user speech commands and/or user contextual speech commands. As further depicted, the audio or audible inputs 204 may also be processed by a musical instrument recognition block 210 and a vocal recognition block 212. For example, in some embodiments, the musical instrument recognition block 210 may be a ML model trained over time to determine and identify specific instruments that may be utilized, for example, by an early-stage user (e.g., keyboards, pianos, drums, guitars, tambourines, makeshift instruments, and so forth) and/or the genre of music (e.g., pop, hip-hop, rock, jazz, EDM, and so forth) that may be most interesting to a particular early-stage user. Similarly, the vocal recognition block 212 may be a ML model trained over time to determine and identify one or more particular songs that the user may be performing (e.g., via vocals or instruments) and/or attempting to perform.

In certain embodiments, as further depicted in FIG. 2, the computer vision block 206, the ASR and NLU block 208, the musical instrument recognition block 210, and the vocal recognition block 212 may provide outputs to an external input processing block 214. In one embodiment, the external input processing block 214 may be provided to separate and isolate, for example, the different user input data (e.g., facial recognition user inputs, gesture user inputs, facial expression user inputs, user voice sounds, user speech commands and replies, user instrumental music, user song notes, and so forth). As depicted, the external input processing block 214 may then provide the separated and isolated user input data to an emotion recognition block 216 that may be utilized to determine, for example, a user emotional response. For example, in some embodiments, particular user facial expressions may be mapped to one of a determined user happiness, user sadness, and/or user indifference as an indication of an engagement level of the user. Such contextual data combined with a baseline preconfigured behavioral model 218 (e.g., initial elementary user learning progression level model) may be then provided to a recommendation engine 222 that may be utilized to determine, for example, a manner in which the interactive electronic device 100 is to adjust content, delivery, user interaction, and/or user engagement (e.g., in real-time or near real-time). Specifically, the recommendation engine 222 may determine one or more actions with respect to each particular user that may interact and/or engage with the interactive electronic device 100.

As further depicted in FIG. 2, the external input processing block 214 may also provide the separated and isolated user input data (e.g., user specific parameters) to a creative control parameter processing block 220. The creative control parameter processing block 220 may also receive an input (e.g., device-derived or device-interpreted parameters) from the recommendation engine 222. In certain embodiments, the creative control parameter processing block 220 may generate one or more user control parameters based on the inputs from the external input processing block 214 and the recommendation engine 222. Specifically, the creative control parameter processing block 220 may include an ML model that may be suitable for determining and identifying user audio or audible inputs concurrently while the interactive electronic device 100 plays back a song, for example. Based on the determined and identified user audio or audible inputs, the interactive electronic device 100 may then perform a real-time or near real-time adjustment to the song currently being played back.

In certain embodiments, the creative control parameter processing block 220 may generate and transmit one or more user control parameters to a creative music generation and creation block 224 for conducting and composing music. Specifically, the creative music generation and creation block 224 may receive inputs from a music library database 226 and a trained models database 228. In one embodiment, the music library database 226 may include a collection of songs, melodies, tunes, instrumentals, and so forth that may be prestored on the interactive electronic device 100. In another embodiment, the music library database 226 may include a cloud-based music streaming service that the interactive electronic device 100 may utilize to access songs, melodies, tunes, instrumentals, and so forth. In some embodiments, as previously discussed, For example, as an early-stage user (e.g., a child, a toddler, a preadolescent), for example, increases interaction and engagement with the interactive electronic device 100, the interactive electronic device 100 may generate a user-specific preference and behavioral model to be iteratively trained and retrained over time based on the series of interactions or engagements between the particular early-stage user and the interactive electronic device 100. The interactive electronic device 100 may store the user-specific preference and behavioral model corresponding to the particular early-stage user, as well as user-specific preference and behavioral models corresponding to other associated users (e.g., one or more siblings of the particular early-stage user) to the trained models database 228. In another embodiment, the trained models database 228 may include a cloud-based database and/or cloud-based service that may correspond to other similar users (e.g., other early-stage users that may be utilizing associated interactive electronic devices 100) that the interactive electronic device 100 may utilize for training and/or qualifying the baseline preconfigured behavioral model 218, for example.

In some embodiments, based on the inputs received from the music library database 226, the trained models database 228, the creative control parameter processing block 220, the creative music generation and creation block 224 may provide a learning progression curriculum to interact, instruct, and engage, for example, an early-stage user (e.g., a child, a toddler, a preadolescent) for conducting and composing music. For example, the creative music generation and creation block 224 may allow an early-stage user to conduct music (e.g., adjust and alter tempo, volume, or other sonic qualities of a song or soundtrack currently being played back by the interactive electronic device 100) by performing user speech commands (e.g., "tempo increase"; "tempo decrease"; "faster"; "slower") or user gesture commands (e.g., a handwave in an faster motion to increase tempo and a handwave in a slower motion to decrease tempo) to increase or decrease tempo of a song currently being played back. Similarly, the creative music generation and creation block 224 may allow an early-stage user to further conduct music by, for example, performing user speech commands (e.g., "volume increase"; "volume decrease"; "louder"; "softer") or user gesture commands (e.g., a handwave in an upward direction to increase volume and a handwave in a downward direction to decrease volume) to increase or decrease volume of a song or soundtrack currently being played back. It should be appreciated that the user speech commands and/or user gesture commands may be allowed to become more and more complex as an early-stage user, for example, advances to higher music conducting learning progression levels.

In certain embodiments, the creative music generation and creation block 224 may allow an early-stage user to compose music (e.g., creating complementary sounds and music using instruments, melodies, tunes, instrumentals, and/or other musical components to create a soundtrack centered around musical elements that a user is controlling as an input to the interactive electronic device 100) by performing user speech commands (e.g., "play piano"; "play guitar"; "play hip-hop"; "more drums"; "add a base drum"; "add a snare drum"; "delete guitar base"; "play rock"; "play chord c"; "play chord d"; and so forth) to start or stop a song or soundtrack currently being played back or to alter one or more elements of instrumentation of a song or soundtrack currently being played back. Likewise, the creative music generation and creation block 224 may allow user gesture and/or body motion responses (e.g., a hand-raising, a hand-waving back and forth, a rhythmic toe-tapping, a head nodding, and so forth) to indicate a particular instrument to introduce into a song or soundtrack currently being played back by the interactive electronic device 100 (e.g., rhythmic toe-tapping may correspond to a snare drum or a base drum, while a slow handwaving back and forth may correspond to a violin or other similar stringed instrument). In one embodiment, the interactive device 100 may mimic or create one or more rhythmic gestures and/or body motions (e.g., dances) in synchronization with the user as the user composes elements of the song or soundtrack. As previously discussed above, the user may also provide instrument inputs during the composition (e.g., the user may begin beating a drum), and the creative music generation and creation block 224 may then remove that corresponding instrument or sound from the song or soundtrack currently being played back and composed. It should further be appreciated that the user speech commands and/or user gestures commands may be allowed by the interactive electronic device 100 to become more and more complex as an early-stage user, for example, advances to higher music composition learning progression levels.

In certain embodiments, as further depicted by FIG. 2, the creative music generation and creation block 224 may provide an output to a contextual conversation engine 230. Particularly, the contextual conversation engine 230 may allow the interactive electronic device 100 to utilize speech (e.g., contextual conversation) with the user to encourage the user, for example, to explore different instruments, melodies, musical genres, and so forth. The contextual conversation engine 230 may also allow the interactive electronic device 100 to utilize speech (e.g., contextual conversation) to provide relevant information about the elements of a song or soundtrack currently being played back and composed. For example, in some embodiments, the contextual conversation engine 230 may access and search a knowledge database 232 that may be preloaded with a plethora of musical reference materials and that may be further updated as the interactive electronic device 100 continue to interact and engaged with the user. As further illustrated, the contextual conversation engine 230 may access a robot persona database 234, which may include prestored unique personality traits that may allow the interactive electronic device 100 to exhibit a sense of agency and individuality with respect to music generation and creation (e.g., personal likes and dislikes of certain musical genres or certain instruments).

In certain embodiments, as further illustrated by FIG. 2, the creative music generation and creation block 224 may also provide an output to an external output processing block 236. Specifically, the audio, audible, and motional based outputs of the interactive electronic device 100 may be controlled and regulated by the external output processing block 236. For example, as depicted, the external output processing block 236 may take the output provided by the creative music generation and creation block 224 and may formulate that data and provide an output an emotion module block 238 (e.g., a determination of user happiness, user sadness, and/or user indifference as an indication of a user engagement level), an output music block 240 (e.g., the output of the created or composed music), and an input music block 242 (e.g., music related to music being played or generated by the user). For example, once the characteristics of a song or soundtrack is altered (e.g., through conducting) or created (e.g., through composition), the output music block 240 and the input music block 242 may be provided in conjunction to separate and isolate any original input music from the newly generated and created music. The speech output block 244 may receive an output from the contextual conversation engine 230 that may be then passed to a speech and/or text-to-speech (TTS) block 245 to generate speech for communicating with the user.

As further depicted by FIG. 2, the output music block 240 may pass outputs to a movement module block 246. The movement module block 246 may be utilized to control or manipulate a head control output 248, a body control output 250, a spatial control output 252, and a face control output 254. The head control output 248, the body control output 250, the spatial control output 252, and the face control output 254 may correspond to one or more body motions (e.g., physical motions, mechanical motions), facial expressions, and/or illuminations that may be performed by the interactive electronic device 100 in response thereto. For example, in one embodiment, the head control output 248, the body control output 250, the spatial control output 252, and the face control output 254 may provide signals to one or more motors and actuators 110 of the interactive electronic device 100 to perform one or more mechanical motions and/or other physical activity. The output music block 240 may also pass outputs to an audio module block 256 that may process a final audio or audible signal to be outputted to the user via a speaker control output 258.

FIG. 3 illustrates is a flow diagram of a method 300 for providing interactive music conducting and composing activity through intelligence based learning progression levels utilizing an interactive electronic device, in accordance with the presently disclosed embodiments. Specifically, as previous discussed above, the interactive electronic device 100 may be provided to interact, instruct, and engage with one or more early-stage users (e.g., children, toddlers, pre-adolescents) in the creation and learning of music conducting and composition through intelligence based progression learning (e.g., creativity and learning levels progress as the early-stage user advances in age, advances in expertise, and/or as the early-stage user interest wanes). In this way, the interactive electronic device 100 may provide a sense of peer-to-peer companionship (e.g., a sense of social and emotional bonding between an early-stage user and the interactive electronic device 100 or a sense of "growing-up together" between the early-stage user and the interactive electronic device 100) for early-stage users over the course of, for example, the entire toddlerdom and childhood of the early-stage user. The method 300 may be performed utilizing one or more processing devices (e.g., interactive electronic device 100) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or some combination thereof.

The method 300 may begin block 302 with one or more processing devices (e.g., interactive electronic device 100) generating a first musical interaction behavioral model to cause an interactive electronic device to perform a first set of musical operations and a first set of motional operations. For example, in certain embodiments, the interactive electronic device 100 may be initially suited according to a baseline preconfigured behavior (e.g., initial elementary user learning progression level), which may include, for example, a predetermined baseline set of musical operations (e.g., a baseline set of simpler songs, singular instrument sounds, single instrument instrumentals, simple speech phrases, child-friendly sing-along vocals, melodies, and/or other simple musical operations for conducting or composing) and a predetermined baseline set of motional operations (e.g., a baseline set of head and neck motions, limb and joint motions, body motions, and so forth).

The method 300 may continue at block 304 with the one or more processing devices (e.g., interactive electronic device 100), while performing the first set of musical operations and the first set of motional operations, storing one or more user inputs received in response to the performance of the first set of musical operations and the first set of motional operations. For example, in some embodiments, while performing the predetermined baseline set of musical operations and motional operations, the interactive electronic device 100 may receive and store in real-time or near real-time various user inputs, such as visual user inputs (e.g., user gestures, user body language, user physical motions, and so forth), user audible inputs (e.g., user voice sounds, user speech commands and replies, user instrumental music, user song notes, and so forth), user engagement level inputs (e.g., user eye gaze indicating an attentional level of the user; user facial expression indicating an emotional response of the user such as happy, sad, or indifferent; user physical activity; and so forth).

The method 300 may then continue at block 306 with the one or more processing devices (e.g., interactive electronic device 100) determining a user learning progression level based at least in part on the one or more user inputs, and then continue at decision 308 with the one or more processing devices (e.g., interactive electronic device 100) determining whether the user learning progression level is above or below a threshold. For example, as previously discussed, as an early-stage user increases interaction or engagement with the interactive electronic device 100, each user engagement may provide training data for the generation of a user-specific preference and behavioral model for the interactive electronic device 100 that may be iteratively updated and retrained. In some embodiments, the user-specific preference and behavioral model generated by the interactive electronic device 100 may include a predetermined number of learning progression levels and/or a predetermined number of sets of learning progression levels.

For example, in one embodiment, the interactive electronic device 100 may include a learning progression curriculum that prompts an early-stage user, for example, to identify and match the sound of a particular instrument currently being played by the interactive electronic device 100. Thus, in such a case, the predetermined learning progression levels may include, for example: 1) identify and match the sound of one particular instrument; 2) identify and match the sound of two instruments; 3) identify and match the sound of three instruments; 4) identify and match a certain medley of instruments included within a particular song; 5) identify and match the individual medleys of instruments included within a repertoire of songs. In another example, the interactive electronic device 100 may include a learning progression curriculum that prompts an early-stage user, for example, to identify and repeat one or more vocal range pitches being led by the interactive electronic device 100. In this case, the predetermined learning progression levels may include, for example: 1) identify and repeat a soprano vocal pitch; 2) identify and repeat a baritone vocal pitch; 3) identify and repeat a soprano vocal pitch, a baritone vocal pitch, and a tenor vocal pitch; 4) identify and repeat a soprano vocal pitch, a baritone vocal pitch, a tenor vocal pitch, and a bass vocal pitch; 5) identify and repeat a coloratura vocal pitch, a falsetto vocal pitch, a lirico-spinto vocal pitch, and a mezzo-sopranos vocal pitch.

In some embodiments, the interactive electronic device 100 may determine whether the user learning progression level is above or below the threshold by comparing the user inputs (e.g., vocal inputs, instrument inputs, gesture inputs, and so forth) performed in response to a particular learning progression curriculum with respect to, for example, the baseline preconfigured behavior. In one embodiment, the interactive electronic device 100 may compare the user inputs (e.g., vocal inputs, instrument inputs) to a generated user-specific learning benchmark (e.g., based on historical data for a particular early-stage user) to determine whether the early-stage user is above a proficiency level. In other embodiments, the interactive electronic device 100 may access, for example, a cloud-based database and compare the user inputs (e.g., vocal inputs, instrument inputs, gesture inputs, and so forth) to the proficiency level of other early-stage users determined to be at the baseline preconfigured behavior.

Further, in another embodiment, the interactive electronic device 100 may determine whether the user learning progression level is above or below the threshold based on a determined user engagement level (e.g., user eye gaze indicating an attentional level of the user; user facial expression indicating an emotional response of the user such as happy, sad, or indifferent; user physical activity; and so forth). For example, if the user is determined to be happy (e.g., smiling facial expression) and/or attentive (e.g., eyes gazing at the interactive electronic device 100 for a certain period of time), the interactive electronic device 100 may determine that the user is engaged and currently at the appropriate learning progression level or provide a recommendation of when the user should consider advancing to a next learning progression level. On the other hand, if the user is determined to be sad (e.g., crying or frowning facial expression) and/or indifferent (e.g., sullen facial expression or eyes looking away from the interactive electronic device 100 for a certain period of time), the interactive electronic device 100 may determine that the user is disengaged and should be advanced to a next learning progression level or deduce enough to stop the activity. In another embodiment, if the user is determined to be sad (e.g., crying or frowning facial expression) and/or indifferent (e.g., sullen facial expression or eyes looking away from the interactive electronic device 100 for a certain period of time), the interactive electronic device 100 may determine that the user is disengaged and/or disinterested and may thus switch to a different activity that may be more engaging and/or interesting to the user.

In response to determining that the user learning progression level is above the threshold, the method 300 may then continue at block 310 with the one or more processing devices (e.g., interactive electronic device 100) generating a second musical interaction behavioral model to cause the interactive electronic device to perform a second set of musical operations and a second set of motional operations. For example, as previously noted, the interactive electronic device 100 may generate a user-specific preference and behavioral model that may be trained and retrained as an early-stage user engages with the interactive electronic device 100. The user-specific preference and behavioral model (e.g., corresponding to advancing user learning progression levels) may include, for example, a predetermined advanced set of musical operations (e.g., an advanced set of songs, instruments, sounds, speech phrases, phonetic sounds, sing-along vocals, melodies, humming, chord sequences, contextual interactions, and/or other musical operations for conducting or composing) and a predetermined advanced set of motional operations (e.g., an advanced set of head and neck motions, limb and joint motions, body motions, dance motions, eye motions, and so forth). Specifically, in accordance with the presently disclosed embodiments, the interactive electronic device 100 may generate a user-specific preference and behavioral model that may iteratively learn and adapt to a particular early-stage user. Moreover, as the interactive electronic device 100 may receive and store past interactions and engagements with the particular early-stage user, the user-specific preference and behavioral model may iteratively adjust, for example, the course of the playback of the current music, the manner in which that the playback of the current music responds to user commands (e.g., real-time or near real-time user speech commands, user gesture commands, and/or user emotional responses), and the most effective manner in which to better engage the particular early-stage user at any particular point in time during the playback of the current music. The method 300 may then continue at block 312 with the one or more processing devices (e.g., interactive electronic device 100) performing the second set of musical operations and the second set of motional operations in accordance with the second musical interaction behavioral model.

On the other hand, in response to determining that the user learning progression level is below the threshold, the method 300 may then continue at block 314 with the one or more processing devices (e.g., interactive electronic device 100) generating a third musical interaction behavioral model for causing the interactive electronic device to perform a third set of musical operations and a third set of motional operations. For example, in some embodiments, the interactive electronic device 100 may determine that the baseline preconfigured behavioral model is itself beyond the learning progression level of a particular early-stage user (e.g., a toddler) as the interactive electronic device 100 learns and adapts to the early-stage user based on, for example, the increasing interaction and engagement with the early-stage user. The interactive electronic device 100 may then generate a lower learning progression level user-specific preference and behavioral model, which may correspond to, for example, a set of musical operations (e.g., simpler than that of the preconfigured baseline musical operations, such as a set of lullaby tunes without accompanying vocals) and set of motional operations (e.g., simpler than that of the preconfigured baseline musical operations, such as only vertical and horizontal head motions while the body of the interactive electronic device remains fixed so as to not alarm the early-stage user). The method 300 may then conclude at block 316 with the one or more processing devices (e.g., interactive electronic device 100) performing the third set of musical operations and the third set of motional operations in accordance with the third musical interaction behavioral model.

Thus, the present embodiments may provide an interactive electronic device 100 to instruct, interact, and engage with early-stage users in the creation and generation of music conducting and composition through intelligence based progression learning (e.g., creativity and learning levels progress as the early-stage user advances in age, advances in expertise, and/or as the early-stage user interest wanes). In this way, the interactive electronic device 100 may provide a sense of peer-to-peer companionship (e.g., a sense of social and emotional bonding between an early-stage user and the interactive electronic device 100 or a sense of "growing-up together" between the early-stage user and the interactive electronic device 100) for early-stage users over the course of, for example, the entire toddlerdom and childhood of the early-stage user.

FIG. 4 illustrates an example computer system 400 that may be useful in performing one or more of the foregoing techniques as presently disclosed herein. In certain embodiments, one or more computer systems 400 perform one or more steps of one or more methods described or illustrated herein. In certain embodiments, one or more computer systems 400 provide functionality described or illustrated herein. In certain embodiments, software running on one or more computer systems 400 performs one or more steps of one or more methods described or illustrated herein or provides functionality described or illustrated herein. Certain embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks.

Where appropriate, one or more computer systems 400 may perform without substantial spatial or temporal limitation one or more steps of one or more methods described or illustrated herein. As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In certain embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement. In certain embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In certain embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In certain embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In certain embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In certain embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In certain embodiments, one or more memory management units (MMUs) reside between processor 402 and memory 404 and facilitate accesses to memory 404 requested by processor 402. In certain embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In certain embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In certain embodiments, storage 406 is non-volatile, solid-state memory. In certain embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In certain embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In certain embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In certain embodiments, bus 412 includes hardware, software, or both coupling components of computer system 400 to each other. As an example, and not by way of limitation, bus 412 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Herein, "automatically" and its derivatives means "without human intervention," unless expressly indicated otherwise or indicated otherwise by context.

Additionally, herein, at least one of the plurality of modules may be implemented through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system. The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The embodiments disclosed herein are only examples, and the scope of this disclosure is not limited to them. Embodiments according to the embodiment are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method implemented by a computing system, the method comprising:
    generating a first musical interaction behavioral model, wherein the first musical interaction behavioral model is configured to cause an interactive electronic device to perform a first set of musical operations and a first set of motional operations;
    while performing the first set of musical operations and the first set of motional operations, receiving one or more user inputs in response to the performance of the first set of musical operations and the first set of motional operations;
    determining a user learning progression level based at least in part on the one or more user inputs;
    in response to determining that the user learning progression level is above a threshold, generating a second musical interaction behavioral model, wherein the second musical interaction behavioral model is configured to cause the interactive electronic device to perform a second set of musical operations and a second set of motional operations; and
    performing the second set of musical operations and the second set of motional operations in accordance with the second musical interaction behavioral model.

2. The method of claim 1, wherein performing the first set of musical operations and the first set of motional operations comprises performing a set of musical operations and a set of motional operations in accordance with a predetermined baseline user learning progression level.

3. The method of claim 1, wherein the first set of musical operations comprises a set of musical conducting operations or a set of musical composing operations.

4. The method of claim 1, wherein the first set of motional operations comprises a set of head motions, a set of body motions, or a combination thereof.

5. The method of claim 1, wherein the one or more user inputs received in response to the performance comprises one or more of a visual user input, an audible user input, or a gesture user input.

6. The method of claim 1, further comprising storing the one or more user inputs received in response to the performance as historical user interaction data over a period of time.

7. The method of claim 1, wherein determining the user learning progression level comprises determining a user engagement level.

8. The method of claim 7, wherein determining the user engagement level comprises determining an emotional response of a user while performing the first set of musical operations and the first set of motional operations.

9. The method of claim 1, wherein the second musical interaction behavioral model is associated with a first user of a plurality of users, the method further comprising:
    determining that a second user of the plurality of users is interacting with the interactive electronic device; and
    generating a third musical interaction behavioral model associated with the second user, wherein the third musical interaction behavioral model is configured to cause the interactive electronic device to perform a third set of musical operations and a third set of motional operations.

10. The method of claim 1, wherein performing the second set of musical operations and the second set of motional operations comprises performing a set of musical operations and a set of motional operations in accordance with an advanced user learning progression level.

11. A system comprising:
    one or more non-transitory computer-readable storage media including instructions; and
    one or more processors coupled to the storage media, the one or more processors configured to execute the instructions to:
        generate a first musical interaction behavioral model, wherein the first musical interaction behavioral model is configured to cause an interactive electronic device to perform a first set of musical operations and a first set of motional operations;
        while performing the first set of musical operations and the first set of physical operations, receive one or more user inputs in response to the performance of the first set of musical operations and the first set of motional operations;
        determine a user learning progression level based at least in part on the one or more user inputs;
        in response to determining that the user learning progression level is above a threshold, generate a second musical interaction behavioral model, wherein the second musical interaction behavioral model is configured to cause the interactive electronic device to perform a second set of musical operations and a second set of motional operations; and
        perform the second set of musical operations and the second set of motional operations in accordance with the second musical interaction behavioral model.

12. The system of claim 11, wherein the one or more processors are further configured to execute the instructions to perform a predetermined baseline set of musical operations and a predetermined baseline set of motional operations as the first set of musical operations and the first set of motional operations, respectively.

13. The system of claim 11, wherein the one or more processors are further configured to execute the instructions to generate a set of musical conducting operations or a set of musical composing operations as the first set of musical operations.

14. The system of claim 11, wherein the one or more processors are further configured to execute the instructions to generate a set of head motions, a set of body motions, or a combination thereof, as the first set of motional operations.

15. The system of claim 11, wherein the one or more processors are further configured to execute the instructions to determine a user engagement level as the user learning progression level.

16. The system of claim 15, wherein the one or more processors are further configured to execute the instructions to determine an emotional response of a user while performing the first set of musical operations and the first set of motional operations as the user engagement level.

17. The system of claim 11, wherein the one or more processors are further configured to execute the instructions to:
in response to determining that the user learning progression level is below the threshold, generate a third musical interaction behavioral model, wherein the third musical interaction behavioral model is configured to cause the interactive electronic device to perform a third set of musical operations and a third set of motional operations.

18. A non-transitory computer-readable medium comprising instructions that, when executed by one or more processors of a computing system, cause the one or more processors to:
generate a first musical interaction behavioral model, wherein the first musical interaction behavioral model is configured to cause an interactive electronic device to perform a first set of musical operations and a first set of motional operations;

while performing the first set of musical operations and the first set of physical operations, receive one or more user inputs in response to the performance of the first set of musical operations and the first set of motional operations;

determine a user learning progression level based at least in part on the one or more user inputs; and in response to determining that the user learning progression level is above a threshold, generate a second musical interaction behavioral model, wherein the second musical interaction behavioral model is configured to cause the interactive electronic device to perform a second set of musical operations and a second set of motional operations; and perform the second set of musical operations and the second set of motional operations in accordance with the second musical interaction behavioral model.

\* \* \* \* \*